United States Patent Office 3,669,782
Patented June 13, 1972

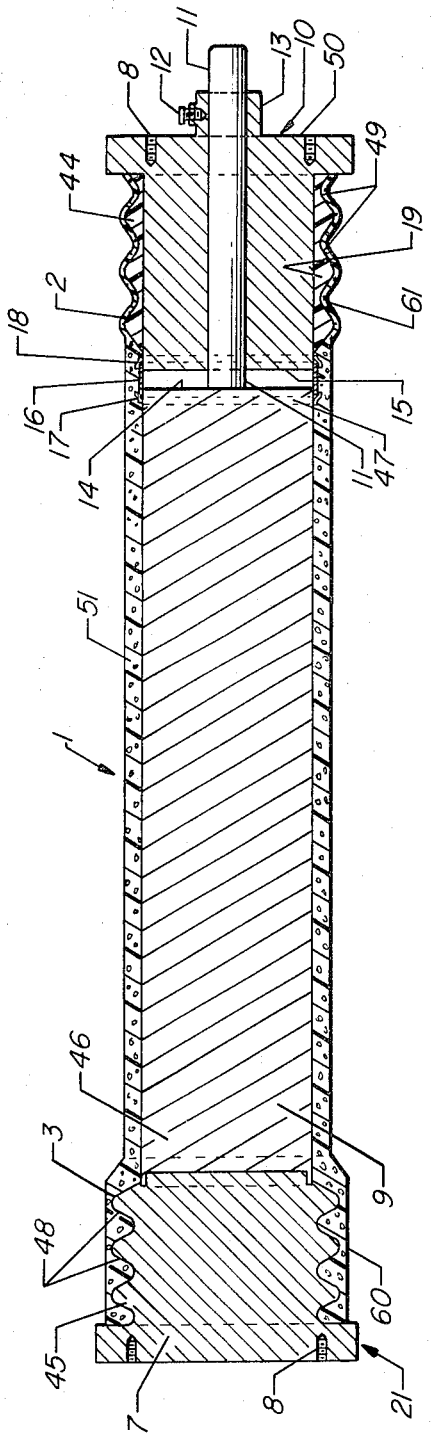
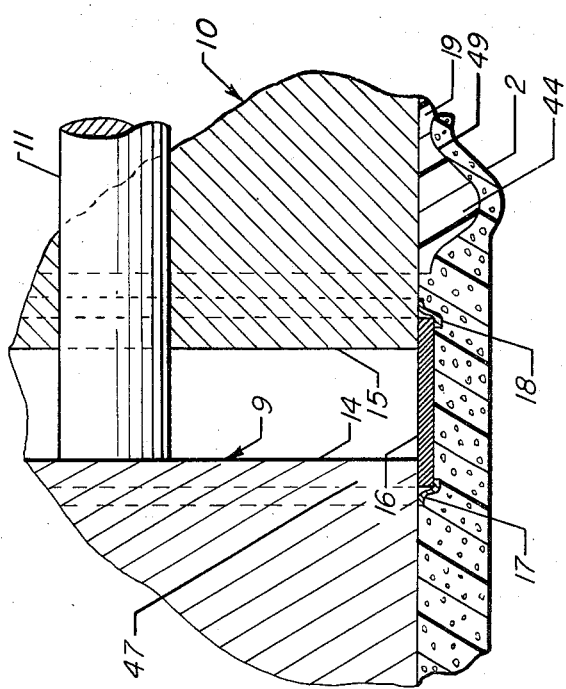

3,669,782
METHOD FOR COMPENSATING FOR RESIN SHRINKAGE IN THE PRODUCTION OF A FILAMENT WOUND ARTICLE
Jack Lowrie McLarty, Milwaukee, Wis., assignor to Universal Oil Products Company, Des Plaines, Ill.
Filed May 25, 1970, Ser. No. 40,180
Int. Cl. B32b 1/08
U.S. Cl. 156—84
8 Claims

ABSTRACT OF THE DISCLOSURE

An improved method of producing a filament wound article utilizing a mandrel of unique construction. This invention is useful in producing filament wound articles on mandrels having opposing winding surfaces having components normal to the axis of the mandrel. Such articles include pressure vessels, pipe having threads wound in at both ends, pipe having overhanging collars at both ends, or pipe threaded at one end with an overhanging collar at the other end.

---

This invention relates to an improved method of producing a filament wound article using a mandrel of unique construction. The invention is useful in producing filament wound articles on mandrels having opposing winding surfaces having components normal to the axis of the mandrel. Such articles include pressure vessels, pipe having threads wound at both ends, pipe having overhanging collars at both ends, or pipe threaded at one end with an overhanging collar at the other end.

BACKGROUND OF THE INVENTION

In the construction of filament wound pipe, shrinkage of the resin is a factor which in every case must be considered in determining the final dimensions of a filament wound article. In glass filament reinforced articles, a volume of shrinkage of from 1 to 6 percent occurs using epoxy resins as compared with a shrinkage of 7 to 10 percent for polyester resins. Shrinkage of the resin presents a critical problem where the article has opposing winding surfaces having components normal to the axis of the mandrel separated by a large longitudinal distance. The glass or other reinforcing filaments are placed in tension and bear against these opposing surfaces during the filament winding process. If the length of the filament wound article is great as compared with its transverse dimensions, the resin shrinkage during curing will cause the resin bonds to break away from the reinforcing filaments which remain static due to their positioning against the opposing filament winding surfaces. This shrinkage of the resin creates surface imperfections in the filament wound article and cracks which sometimes extend through the wall of the article. For example, the shrinkage of a polyester resin will tear and destroy pipe threads wound into both ends of a 20 foot pipe having an inside diameter of 8 inches. Pipe threads which are wound into a filament wound pipe, while superior in performance to other forms of pipe attachment devices, are particularly susceptible to damage from shrinkage of the resin during curing when the pipe has a large length as compared with its diameter.

SUMMARY

The broad object of this invention is to prevent damage due to resin shrinkage from occurring in filament wound articles reinforced by resin impregnated filaments and wound on a mandrel or other form having opposing winding surfaces with components normal to the axis of the mandrel. The greater the length of the article, the greater is the likelihood of damage due to resin shrinkage without the practice of the present invention.

A narrower related object of the invention is to produce a filament wound pipe of a large length having threads wound in at both ends of the pipe. Such pipe is produced by helically winding resin impregnated glass filaments upon a mandrel knurled at the ends in the form of helical threads. Helical winding is at a pitch greater than the thread pitch. The threads are wound into the pipe as the glass filaments are positioned to alternately deviate in radial disposition with respect to the axis. Both interior and exterior pipe threads are formed at the ends of the pipe. The filaments following this contour bear against opposing winding surfaces which have components normal to the axis of the mandrel. These opposing winding surfaces are those faces of the knurled ridges which are nearest to the pipe ends.

In a broad aspect this invention is, in a method of producing a filament wound article impregnated with resin on a mandrel having an extensible portion and having opposing winding surfaces having components normal to the axis of the mandrel located on opposite sides of said extensible portion wherein filaments of said article bear against said opposing winding surfaces and are thereby held in tension during filament winding, the improvement comprising: locking said extensible portion of said mandrel in an extended position during filament winding; and releasing said extensible portion of said mandrel subsequent to filament winding, whereby shrinkage of said resin during curing causes said extensible portion of said mandrel to contract from said extended position.

In another aspect of this invention may be considered to be a mandrel having an axis and suitable for producing a filament wound article impregnated with resin comprising: a cylindrical central section having opposite extremities; end sections having opposing winding surfaces having components normal to said axis of said mandrel connected to the opposite extremities of said central section; and an extensible portion located between said end sections.

BRIEF DESCRIPTION OF THE DRAWINGS

The invention may be more fully described by reference to the accompanying drawings.

FIG. 1 is an elevational view in partial section of a filament wound article positioned about a mandrel of this invention and illustrates the method of this invention.

FIG. 2 is an enlarged view of the extensible portion of the mandrel illustrated in FIG. 1.

DETAILED DESCRIPTION

Figure 3:
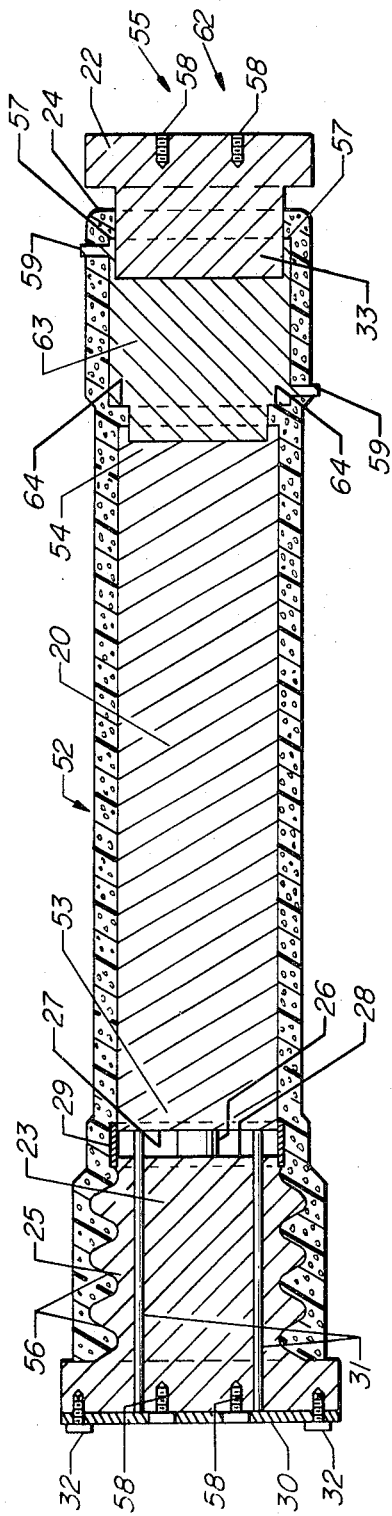
FIG. 3 is an alternative embodiment of the mandrel of this invention.

Referring now to FIG. 1, there is shown a filament wound pipe 1 threaded at both ends and positioned upon a mandrel 21. Mandrel 21 has an axis and is suitable for producing a filament wound article impregnating with resin. Mandrel 21 is comprised of a cylindrical central section 9 having opposite extremities 46 and 47, end sections 7 and 10 having opposing winding surfaces 48 and 49 respectively, and an extensible portion located between end sections 7 and 10. Both of the end sections 7 and 10 have machine holes 8 extending longitudinally therein. These machine holes 8 accommodate fastening fingers protruding from a filament winding machine. The fingers are rotated, thereby turning the mandrel assembly 21 and allowing pipe 1 to be wound thereon. The opposing winding surfaces 48 and 49 have components normal to the axis of the mandrel. That is, they extend radially outward from the mandrel.

The opposing winding surfaces 49 and 48 are comprised of part of the exterior surfaces of the opposite ends 10 and 7 of the mandrel 21 which are knurled in the form of pipe threads 44 and 45 respectively. Thus, the opposing winding surface at one end of the mandrel is comprised of the helical surface or face 48 of the knurled ridges or threads 45, while the opposing winding surface at the other end of the mandrel is comprised of the helical surface or face 49 of the knurled ridges or threads 44. The male pipe threads 2 of pipe 1 are formed on ridges 44 at end section 10 while the female pipe threads 3 are formed at end section 7. The end sections 7 and 10 are connected to the opposite extremities 46 and 47 respectively. A first of the opposite extremities of central section 9, that is, extremity 47, terminates in an extremity face 14 transverse to the mandrel axis with an axial shaft 11 extending therefrom. A first of the end sections of the mandrel 21, that is, end section 10, has an axial hole therethrough and an end section face 15 parallel and adjacent to extremity face 14. End section 10 is positioned about shaft 11 and is axially movable with respect to central section 9. End section 10 is equipped with a fastening means whereby end section 10 is lockable in absolute immobility with respect to shaft 11 in an extended position wherein end section face 15 and extremity face 14 are axially displaced from each other, as illustrated in FIGS. 1 and 2. The fastening means is comprised of an annular collar 13, having a tapped radial hole therethrough, extending from the main body of end section 10. A locking screw 12 is threadably engaged in the tapped hole in collar 13 and when screwed into the tapped hole to contact shaft 11, renders end portion 10 absolutely immobile with respect to shaft 11 and central portion 9.

A thin axial sleeve 16 surrounds the extremity face 14 and the end section face 15 and spans the distance therebetween when end section 10 is in the extended position illustrated in FIG. 1. The thin axial sleeve 16 may be constructed of any solid material, but for the sake of economy is normally comprised of a piece or pieces of scrap filament wound pipe of the same internal diameter but of a smaller external diameter in comparison with the filament wound article 1. The thin axial sleeve 16, the end section face 15, and the extremity face 14, together form the extensible portion of the mandrel 21. A further addition to the extensible portion of mandrel 21 are the lengths of tape 17 and 18 extending circumferentially around the mandrel. Length 18 of the tape is in contact with the axial sleeve 16 and the end section 10. The other length 17 is in contact with the axial sleeve 16 and the central section 9 of the mandrel 21. The tapes are not bonded either to the axial sleeve 16 or to any portion of the mandrel tightly enough to restrain axial movement of the end section 10 with repect to the central section 9 of the mandrel 21. Instead, the tape is merely wolnd around the interfaces between the edges of the sleeve 16 and the sections of the mandrel to prevent seepage of resin into the vacancy left by the axial displacement of end section 10 when end section 10 is in the extended position. This renders unnecessary a subsequent cleaning operation to restore the mandrel to a condition suitable for subsequent filament winding.

Filament wound pipe 1 is produced according to this invention by locking the extensible portion of the mandrel 21 in an extended position as shown in FIGS. 1 and 2. Thereafter, the mandrel is at least partially coated with a release agent to facilitate the subsequent removal of the mandrel from the curved pipe. The central section 9 and the female end section 7 are coated with a resin release agent, but the detachable annular ring 19 is left uncoated. The mandrel 21 is then helically overwound with resin impregnated glass filaments at a winding pitch greater than the pipe thread pitch, thereby forming a filament wound pipe threaded at both ends. The pitch of filament winding is greater than the pitch between adjacent threads 2 on the male end 61 of pipe 1 and greater than the pitch between adjacent threads 3 on the female end 60 of pipe 1. That is, the longitudinal distance between two successive loops of glass filaments is greater than the longitudinal distance between the crests of adjacent pipe threads. This is necessary so that longitudinal strength is imparted to the threads formed in the filament wound pipe 1. It is necessary, however, that the winding pitch not be too great, for the filaments will then tend to bridge between adjacent crests of the ridges or crests 44 and 45 and thereby render indistinct both the male and female threads of the filament wound pipe 1. For a given thread configuration, therefore, the pitch of filament winding has an upper and a lower limit beyond which the threads formed will be imperfect and indistinct or lacking in longitudinal strength.

Subsequent to the formation of the initial layers of the filament wound pipe 1, the central body portion 51 and the female end 60 of the pipe 1 are overwound for reinforcement. This reinforcement winding is at a winding pitch greater than the winding pitch used to form the basic pipe and thereby obscures the exterior of the threads at the female end 60. The nominal diameter of the interior of the female end 60 of the pipe 1 is equal to the nominal diameter of the exterior of the male end 61 of the pipe 1, whereby identical pipe sections can be threadably engaged to extend in an indefinite length.

After the mandrel 21 is overwound with resin impregnated glass filaments the extensible portion of the mandrel 21 is released. The extensible portion of the mandrel 21 is locked in absolute immobility during winding and may be released by unlocking from absolute immobility through the withdrawal of the screw 12 from complete engagement against shaft 11 in the tapped hole in collar 13. Another feature of the release from absolute immobility is that it is accompanied by biasing the extensible portion of the mandrel against contraction. That is, forces are created which restrain end section face 15 from drawing into contact with extremity face 14 due to the forces generated by the shrinkage of the resin of the filament wound article 1 during curing. This biasing is achieved by dimensioning the shaft 11 to have a close tolerance within the hole extending through the end section 10. The frictional forces generated by the sliding together of end section 10 and central section 9 oppose the forces generated by shrinkage of the resin. These frictional forces must be small enough so that the forces generated by the shrinkage of the resin may overcome the bias against contraction and cause the extensible portion of the mandrel to contract. The purpose of providing for frictional forces in the movement of end section 10 along shaft 14 is to improve the definition of the male threads 2 and the female threads 3 of the filament wound pipe 1 by always maintaining the reinforcing filaments in tension during the filament winding process and during the curing process.

After releasing the extensible portion of the mandrel the resin in the resin impregnated filaments is cured, either at room temperature or by heating. In either case, shrinkage of the resin during curing causes the extensible portion of the mandrel 21 to overcome the bias of the frictional forces along shaft 11 and to contract from the extended position depicted in FIG. 1.

After curing, at least part of the mandrel is removed from the filament wound pipe. The mandrel 21 used in this invention may be in one of several forms. The mandrel may be constructed to be completely removable from the filament wound pipe constructed thereon. In this case, at least one of the end sections of the mandrel is slideably removable from the remaining portion of the mandrel so that the parts of the mandrel can be easily unthreaded from the threads formed on the filament wound pipe created, after the filament wound pipe is cured. If such mandrel is used, the entire mandrel is initially coated with a release agent, and the entire mandrel is removed from the cured pipe. If it is desired to reinforce the male end of the pipe by covering the interior threads at the male end with a filler material, this is done subsequent to the removal of the mandrel parts from the filament wound pipe. Filler material, such as resin impregnated chopped strand glass or a resin coated thermoplastic, is applied to the interior of the male end of the filament wound pipe and the interior surface created is smoothed to blend into the central body portion of the pipe.

An alternative construction, however, is used in the mandrel 21 illustrated in FIGS. 1 and 2. A portion of one end of the mandrel 21 becomes incorporated into the filament wound pipe 1 produced thereon, so that mandrel 21 is initially only partially coated with a release agent and only part of the mandrel is removed from the cured filament wound pipe. The male end of the mandrel, end section 10, is comprised of a detachable annular ring 19 slideable in a longitudinal direction and positioned about a form 50. Annular ring 19 has an exterior surface knurled in the form of ridges or threads 44 and a smooth interior surface. The exterior of the annular ring 19 is left uncoated by the release agent which is applied to the remaining exterior surface of the mandrel. As the resin impregnated fiberglass filaments are overwound thereon, the annular ring 19 becomes bonded to these filaments and incorporated into the filament wound pipe 1 as an integral part thereof. Such a construction allow the male end of the filament wound pipe 1 to be reinforced without any subsequent finishing operations required after the pipe produced has cured. After curing this embodiment of the pipe, the remainder of the mandrel, comprising form 50, central section 9, and female end section 7, is removed from the pipe and the annular ring 19 is incorporated into the filament wound pipe 1. While end sections 7 and 10 and central section 9 of mandrel 21 have been depicted as solid members, it is equally possible to use hollow or partially hollow members.

While any conventional thermosetting resin and any conventional filamentary reinforcing material may be used to produce the filament wound pipe 1, glass strands are normally used as the reinforcing filamentary material and either an epoxy resin or a polyester resin with an appropriate curing agent is used as the thermosetting resin to bind the reinforcing filaments.

In summary, the essential features of the inventive method explained in connection with FIGS. 1 and 2 may be considered to be a method of producing a filament wound pipe threaded at both ends using a mandrel having a cylindrical central section having opposite extremities, end sections knurled in the form of pipe threads and connected to each of said extremities of said central section, and an extensible portion located between the end section, comprising: locking the extensible portion of the mandrel in an extended position; at least partially coating the mandrel with a release agent; helically over-winding the mandrel with resin impregnated glass filament at a pitch greater than the pipe thread pitch, thereby forming a filament wound pipe threaded at both ends; releasing the extensible portion of the mandrel; curing the resin impregnated filaments whereby shrinkage of the resin during curing causes the extensible portion of the mandrel to contract from the extended position; and removing at least part of the mandrel from the filament wound pipe.

Variations of the method and mandrel of this invention are illustrated in FIG. 3. FIG. 3 illustrates a mandrel 62 having an axis and suitable for producing a filament wound article 52 impregnated with resin. Mandrel 62 is comprised of: a cylindrical central section 20 having opposite extremities 53 and 54, end sections 23 and 55, and in extensible portion located between the end sections. The end sections 23 and 55 have opposing winding surfaces 56 and 57 respectively. Components of the helical face or surface 56 are normal to the axis of the mandrel. The entire surface 57 is normal to the axis of the mandrel. The end sections 23 and 55 are connected to the opposite extremities 53 and 54, respectively of the central section 20. The central section 20 has an axial hole therein and a first of the opposite extremities, that is, extremity 53, terminates in an extremity face 27 transverse to the mandrel axis and perforated by the aforesaid axial hole. A first end section, end section 23, of the mandrel 62, has an end section face 28 and an axial shaft 26 extending therefrom. The end section face 28 is parallel and adjacent to the extremity face 27. The shaft extends into the aforesaid axial hole in the central section 20 and the first end section 23 is thereby axially movable with respect to the central section 20. End section 23 has a fastening means whereby the end section 23 is lockable in absolute immobility in an extended position with respect to the central section 20 illustrated in FIG. 3, wherein the end section face 28 and the extremity face 27 are axially displaced from each other. The fastening means of the mandrel is comprised of back plate 30, screws 32, and two longitudinal rods 31 which extend through longitudinal holes in end section 23 and abut against extremity face 27. Back plate 30 is fastened to end section 23 by means of the screws 32 which extend into tapped longitudinal holes in end section 23. The metal rods 31 are forced by back plate 30 against the extremity face 27 of central section 20 when the extensible portion of the mandrel is locked in the extended position. The rods 31 are longer than the end section 23 by an amount equal to the axial displacement desired for the extensible portion of the mandrel. To release the extensible portion of the mandrel from the extended position, the screws 32 are withdrawn and back plate 30 is removed. Back plate 30 is perforated by holes which provide access to machine fastening holes 58 in end section 23. These machine fastening holes 58 exist in both end section 23 and end section 55 and accommodate fastening fingers protruding from a filament winding machine, similar to the system utilized in the mandrel of FIGS. 1 and 2.

A thin axial sleeve 29 surrounds the extremity face 27 and the end section face 28 and spans the distance therebetween when the end section 23 is in the extended position as illustrated. The thin axial sleeve 29, the end section face 28, and the extremity face 27 together form the extensible portion of the mandrel of FIG. 3. While lengths of tape could extend circumferentially around the mandrel in contact with the axial sleeve 29 and the end section 23 and in contact with the axial sleeve 29 and the central section 20 of the mandrel, such lengths of tape have been omitted for they are not essential elements of the invention.

A first of the opposing winding surfaces, the surface 56, is comprised of a portion of the exterior surface of end section 23 of the mandrel, which is knurled in the form of pipe threads 25. The other, or second, of the opposing winding surfaces is comprised of an opposite end face 57 of the mandrel 62 that narrows abruptly. Surface 57 and the opposing surfaces 56 are opposing winding surfaces having components normal to the axis of the mandrel located on opposite sides of the extensible portion of the mandrel. End section 55 is comprised of an intermediate unit 63 and an end unit 22. At its end, intermediate unit 63 has a diameter greater than the diameter of central section 20. Intermediate unit 63 has a smaller diameter at its other end which is force fitted onto the extremity 54 of central section 20. A gap is left between a portion of intermediate unit 63 and extremity 54 of central section 20 whereby an internal circumferential ridge 64 is formed on the filament wound article 52. End unit 22 is comprised of an interior portion 33 having a diameter equal to that of central section 20 that is force fitted into the intermediate unit 63, thereby forming an annular surface 57, one of the opposing winding surfaces of this embodiment. In the production of the filament wound article 52, resin reinforced filaments are wound at a winding pitch greater than the thread pitch, whereby the filament wound article 52 produced is a filament wound pipe threaded at one end and having a collar 24 at the opposite end. The pipe 52 is formed in much the same manner as is the pipe 1. The extensible portion of the mandrel is locked in absolute immobility by the rods 31 during filament winding, and is released by unlocking from absolute immobility and by biasing the extensible portion against contraction. Biasing again is achieved by closely fitting the shaft 26 into the hole in the central section 20, similar to the arrangement of FIG. 1. In this manner the forces generated by shrinkage of the resin overcome the bias against contraction and cause the extensible portion of the mandrel to contract.

To produce the pipe 52, only slight variations from the method of producing the pipe 1 are necessary. No male portion of the mandrel is necessary, but two radial protrusions 59 are inserted into and extend from the intermediate unit 63 during the filament winding operation so that filaments are wound about these protrusions leaving openings in the walls of the filament wound pipe 52. The protrusions 59 are withdrawn prior to removal of the intermediate unit 63 from the filament wound pipe 52. The openings in the pipe wall could be produced by a subsequent drilling operation, but such an operation weakens the wall of the pipe. Because the pipe 52 has an interior diameter adjacent collar 24 slightly larger than the nominal inside diameter of the pipe, the pipe 52 may be used to join a threaded pipe and an unthreaded pipe. The threaded pipe to be joined must have a male end engageable with the female pipe end of the pipe 52. The unthreaded pipe to be joined must have an external diameter equal to the diameter of the interior portion 33 of the end unit 22. The unthreaded pipe is then inserted into the pipe 52 through the collar 24 until it is seated against ridge 64. Adhesive is forced into the area immediately adjacent the collar 24 through the holes in the pipe 52 which were formed during filament winding by the radial protrusions 59. As the adhesive dries, the unthreaded pipe becomes bonded within the pipe 52.

All of the essential steps used in the production of the filament wound pipe 52 are identical to those heretofore described. That is, the inventive method of producing the pipe 52 is, in a method of producing a filament wound article impregnated with resin on a mandrel having an extensible portion and having opposing winding surfaces having components normal to the axis of the mandrel located on opposite sides of the extensible portion wherein filaments of the article bear against the opposing surfaces and are thereby held in tension during filament winding, the improvement comprising: locking the extensible portion of the mandrel in an extended position during filament winding; and releasing the extensible portion of the mandrel subsequent to filament winding, whereby shrinkage of the resin during curing causes the extensible portion of the mandrel to contract from the extended position. It can be seen that a filament would article also could be produced in accordance with the steps of this invention if both the opposite ends of the mandrel upon which the article were to be produced were to narrow abruptly. In such a case the opposing winding surfaces would be the opposite ends of the mandrel. A filament would article formed thereon would have collars at both opposing ends. Such collars would each be similar to the collar 24 of the filament wound pipe 52.

Figure 4:
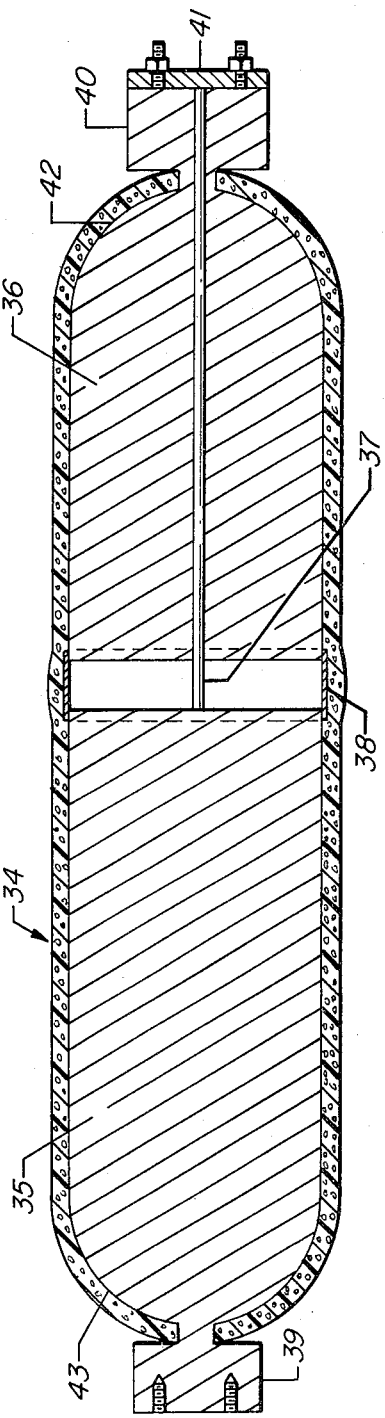
FIG. 4 is another alternative embodiment of the mandrel of this invention.

Similarly, this invention can be utilized to produce a filament wound pressure vessel in which the opposing winding surfaces are comprised of the opposite ends 42 and 43 of a mandrel as in FIG. 4. Each of the opposing winding surfaces 42 and 43 narrows at its extremity and the filament wound article produced is a filament wound pressure vessel. The mandrel of FIG. 4 is comprised of two sections. These are a section 35, terminating in a winding surface 43, and a section 36, terminating in a winding surface 42. A rod 37 extends through an axial hole in mandrel section 36 and is trapped within mandrel section 36 to bear against the adjacent surface of mandrel section 35 by means of an end plate 41 bolted to an extension 40 of the mandrel section 36. End plate 41 is released and rod 37 removed upon completion of filament winding and prior to curing. A thin annular sleeve 38 surrounds the adjacent faces of the mandrel sections 35 and 36. The steps necessary to produce the filament wound pressure vessel 34 of FIG. 4 are identical to those required to produce other filament wound articles according to this invention.

The foregoing description and illustrations of the method of manufacture and the mandrel used therefore are for purposes of illustration only, and no unnecessary limitations should be construed therefrom as other modifications will be obvious to those skilled in the art of filament winding.

I claim as my invention:

1. In a method of producing a filament wound article impregnated with resin on a mandrel having a movable portion and having opposing winding surfaces having components normal to the axis of the mandrel located on opposite sides of said movable portion wherein filaments of said article bear against said opposing winding surfaces and are thereby held in tension during filament winding, the improvement comprising:
   (a) locking said movable portion of said mandrel in an extended position during filament winding;
   (b) releasing said movable portion of said mandrel subsequent to filament winding; and
   (c) curing said article, the shrinkage of said resin during curing causing said movable portion of said mandrel to contract from said etxended position.

2. The method of claim 1 further characterized in that said movable portion of said mandrel is locked in absolute immobility and is released by unlocking from absolute immobility and by biasing said movable portion against contraction, whereby forces generated by shrinkage of said resin overcome the bias against contraction and cause said movable portion of said mandrel to contract.

3. The method of claim 1 further characterized in that said opposing winding surfaces are comprised of the exterior of the opposite ends of said mandrel knurled in the form of pipe threads and said filaments are wound at a winding pitch greater than the pipe thread pitch, whereby said filament wound article produced is a filament wound pipe threaded at both ends.

4. The method of claim 1 further characterized in that a first of said opposing winding surfaces is comprised of portions of the exterior surface of an end of said mandrel knurled in the form of pipe threads and a second of said opposing winding surfaces is comprised of an opposite end of said mandrel that narrows abruptly, and said filaments are wound at a winding pitch greater than the pipe thread pitch, whereby said filament wound article produced is a filament wound pipe threaded at one end and having a collar at an opposite end.

5. The method of claim 1 further characterized in that said opposing winding surfaces are comprised of the opposite ends of said mandrel each of which narrows abruptly.

6. The method of claim 1 characterized in that said opposing winding surfaces are comprised of the opposite ends of said mandrel each of which narrows at its extremity and said filament wound article produced is a filament wound pressure vessel.

7. A method of producing a filament wound pipe threaded at both ends using a mandrel having a cylindrical central section having opposite extremities, end sections knurled in the form of pipe threads and connected to each of said extremities of said central section, and an extensible portion located between said end sections, comprising:
   (a) locking said extensible portion of said mandrel in an extended position;

(b) at least partially coating said mandrel with a release agent;

(c) helically overwinding said mandrel with resin impregnated glass filaments at a pitch greater than the pipe thread pitch, thereby forming a filament wound pipe threaded at both ends;

(d) releasing said extensible portion of said mandrel;

(e) curing said resin impregnated filaments, whereby srinkage of said resin during curing causes said extensible portion of said mandrel to contract from said extended position; and (f) removing at least part of said mandrel from said filament wound pipe.

8. The method of claim 7 further characterized in that the entire mandrel is coated with a release agent, and the entire mandrel is removed from said pipe.

References Cited

UNITED STATES PATENTS

| | | | |
|---|---|---|---|
| 3,484,317 | 12/1969 | Dickerson | 156—175 |
| 2,518,834 | 8/1950 | Streckfus et al. | 161 Shrink Rig. |
| 3,278,654 | 10/1966 | Grandperret | 249—82 |

FOREIGN PATENTS 547,315   5/1956   Belgium.

BENJAMIN A. BORCHELT, Primary Examiner

D. BENT, Assistant Examiner